United States Patent
Gisquet et al.

(10) Patent No.: US 10,531,114 B2
(45) Date of Patent: *Jan. 7, 2020

(54) METHOD AND APPARATUS FOR ENCODING AND DECODING AN IMAGE WITH INTER LAYER MOTION INFORMATION PREDICTION ACCORDING TO MOTION INFORMATION COMPRESSION SCHEME

(71) Applicant: CANON KABUSHIKI KAISHA, Tokyo (JP)

(72) Inventors: Christophe Gisquet, Rennes (FR); Patrice Onno, Rennes (FR); Guillaume Laroche, Melesse (FR); Edouard Francois, Bourg des Comptes (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/013,744

(22) Filed: Jun. 20, 2018

(65) Prior Publication Data

US 2018/0302644 A1 Oct. 18, 2018

Related U.S. Application Data

(63) Continuation of application No. 14/782,303, filed as application No. PCT/EP2014/055862 on Mar. 24, 2014, now Pat. No. 10,027,975.

(30) Foreign Application Priority Data

Apr. 5, 2013 (GB) .................................. 1306221.1

(51) Int. Cl.
*H04N 19/30* (2014.01)
*H04N 19/52* (2014.01)
(Continued)

(52) U.S. Cl.
CPC ............. *H04N 19/52* (2014.11); *H04N 19/31* (2014.11); *H04N 19/463* (2014.11)

(58) Field of Classification Search
CPC .... H04N 19/70; H04N 19/176; H04N 19/172; H04N 19/30; H04N 19/124;
(Continued)

(56) References Cited

U.S. PATENT DOCUMENTS

2012/0189059 A1 7/2012 Segall
2014/0064365 A1* 3/2014 Wang ................... H04N 19/176
375/240.12

FOREIGN PATENT DOCUMENTS

CN 102934440 A 2/2013
CN 107105287 A 8/2017
(Continued)

OTHER PUBLICATIONS

Aiai Huang, et al., "Fast inter-layer predication algorithm for scalable video coding", Journal of Zhejiang University, vol. 46, Vo. 1, Jan. 31, 2012.
(Continued)

*Primary Examiner* — Tung T Vo
*Assistant Examiner* — Samuel D Fereja
(74) *Attorney, Agent, or Firm* — Canon U.S.A., Inc. IP Division

(57) ABSTRACT

The invention concerns a method, device, and computer program for motion vector prediction in scalable video encoder and decoder.
It concerns the process to determine motion information predictor in the enhancement layer of a scalable encoding scheme also known as motion derivation process. It comprises a correction of the position in the reference layer used to pick-up the more relevant motion information available due to the compression scheme. Accordingly, motion information prediction is improved.

6 Claims, 13 Drawing Sheets

(51) Int. Cl.
*H04N 19/463* (2014.01)
*H04N 19/31* (2014.01)

(58) Field of Classification Search
CPC .. H04N 19/105; H04N 19/593; H04N 19/159; H04N 19/184; H04N 19/186; H04N 19/187; H04N 19/136; H04N 19/174; H04N 19/182; H04N 19/46; H04N 19/463; H04N 19/50; H04N 19/61; H04N 19/117; H04N 19/44; H04N 19/122; H04N 19/13; H04N 19/157; H04N 19/17; H04N 19/86; H04N 19/577; H04N 19/126; H04N 19/132; H04N 19/51; H04N 19/597; H04N 19/82; H04N 19/91; H04N 19/119; H04N 19/147; H04N 19/15; H04N 19/31; H04N 19/33; H04N 19/503; H04N 19/625; H04N 19/109; H04N 19/11; H04N 19/423; H04N 19/52; H04N 19/58; H04N 19/96; H04N 21/234327; H04N 21/85406; H04N 19/139; H04N 19/152; H04N 19/154; H04N 19/188; H04N 19/36; H04N 19/39; H04N 19/436; H04N 19/513; H04N 19/59; H04N 19/80; H04N 21/6125; H04N 21/8456; H04N 19/103; H04N 19/107; H04N 19/115; H04N 19/137; H04N 19/14; H04N 19/18; H04N 19/1883; H04N 19/198; H04N 19/40; H04N 19/433; H04N 19/573; H04N 19/85; H04N 19/98; H04N 21/23439; H04N 21/235; H04N 21/2362; H04N 21/26283; H04N 21/4345; H04N 21/435; H04N 21/436; H04N 21/43637; H04N 21/4383; H04N 21/6112; H04N 21/6587; H04N 21/816; H04N 21/8451; H04N 21/858; H04N 13/0066; H04N 19/114; H04N 19/12; H04N 19/127; H04N 19/134; H04N 19/156; H04N 19/162; H04N 19/164; H04N 19/177; H04N 19/192; H04N 19/197; H04N 19/42; H04N 19/521; H04N 19/557; H04N 19/583; H04N 19/587; H04N 19/60; H04N 19/615; H04N 19/64; H04N 19/649; H04N 19/65; H04N 19/66; H04N 19/88; H04N 19/895; H04N 19/90; H04N 19/93; H04N 1/32181; H04N 1/64; H04N 21/00; H04N 21/2335; H04N 21/2343; H04N 21/2353; H04N 21/2358; H04N 21/236; H04N 21/23614; H04N 21/238; H04N 21/2381; H04N 19/146
See application file for complete search history.

(56) References Cited

FOREIGN PATENT DOCUMENTS

EP 2257073 A1 12/2010
WO 2012/097751 A1 7/2012

OTHER PUBLICATIONS

Hannuksela, et al., Test Model for Scalable Extentions of High Efficiency Video Coding (HEVC), Joint Collaborative Team on Video Coding (JCT-VC) of ITU-T SG16 WP3 and ISO/IEC JTC1/SC29/WG11, 11th Meeting, JCTVC-L0453, Oct. 2012.

Park, et al., Modifications of temporal mv memory compression and temporal mv predictor, Joint Collaborative Team on Video Coding (JCT-VC) ofiTU-T SG16 WP3 and ISO/IEC JTC1/SC29/WG11, Mar. 2011.

Lasserre, et al., Description of the scalable video coding technology proposal by Canon Research Centre France, Joint Collaborative Team on Video Coding (JCT-VC) of ITU-T SG16 WP3 and ISO/IEC JTC1/SC29/WG11, Oct. 2012.

* cited by examiner

METHOD AND APPARATUS FOR ENCODING AND DECODING AN IMAGE WITH INTER LAYER MOTION INFORMATION PREDICTION ACCORDING TO MOTION INFORMATION COMPRESSION SCHEME

CROSS-REFERENCE TO RELATED APPLICATIONS

This application is a continuation of U.S. patent application Ser. No. 14/782,303, filed on Oct. 2, 2015, that is a national phase application of international patent application PCT/EP2014/055862, filed on Mar. 24, 2014 and titled "Method and apparatus for encoding and decoding an image with inter layer motion information prediction according to motion information compression scheme" and claims the benefit under 35 U.S.C. § 119(a)-(d) of United Kingdom Patent Application No. 1306221.1, filed on Apr. 5, 2013 and titled "Method and apparatus for encoding or decoding an image with inter layer motion information prediction according to motion information compression scheme", which applications are hereby incorporated by reference herein in their entireties.

The invention generally relates to the field of scalable video coding and decoding, in particular to scalable video coding and decoding that would extend the High Efficiency Video Coding (HEVC) standard. More particularly, the invention concerns a method, device, and computer program for motion vector prediction in scalable video encoder and decoder.

Video coding is a way of transforming a series of video images into a compact digitized bit-stream so that the video images can be transmitted or stored. An encoding device is used to code the video images, with an associated decoding device being available to reconstruct the bit-stream for display and viewing. A general aim is to form the bit-stream so as to be of smaller size than the original video information. This advantageously reduces the capacity required of a transfer network, or storage device, to transmit or store the bit-stream code.

Common standardized approaches have been adopted for the format and method of the coding process, especially with respect to the decoding part. A great majority of past video standards split the video images into smaller sections (called macroblocks or blocks). In the new High Efficiency Video Coding (HEVC) video compression standard being finalized, macroblocks are replaced by so-called Largest Coding Units (LCU) (also called Coding Tree Blocks (CTB)) and are partitioned and adjusted into blocks now called coding units (CU) according to the characteristics of the original image segment under consideration. This allows more detailed coding of areas of the video image which contain relatively more information and less coding effort for those areas with fewer features. Note that an image area is also known under the following different terminologies in the video compression literature: pixel block, block of pixels, block, Coding Unit (CU) and macroblock.

A scalable extension of HEVC is now being defined. In this extension images are considered as being constituted of a plurality of hierarchical layers. The hierarchical layers include a base layer, equivalent to a collection of low quality versions of images (or frames) of the original video sequence, and one or more enhancement layers (also known as refinement layers).

The video images were originally processed by coding each macroblock individually, in a manner resembling the digital coding of still images or pictures. Later coding models allow for prediction of the features in one frame, either from neighboring macroblocks (spatial or INTRA prediction), or by association with a similar macroblock in a neighboring frame (temporal prediction). This allows use of already available coded information, thereby shortening the amount of coding bit-rate needed overall. Differences between the original block to encode and the block used for prediction are captured in a residual set of values. The original block is then encoded in the form of an identifier of the block used for prediction and a residual. Many different types of predictions are possible. Effective coding chooses the best prediction mode providing the best quality for the block to encode upon decoding, while taking account of the bit-stream size induced by each prediction mode to represent said block in the bit-stream. A trade-off between the decoded picture quality and reduction in required bitrate, also known as the rate/distortion trade-off, is the overall goal.

In the case of temporal prediction, several type of prediction are possible and can be gathered under two main types: mono-directional prediction and bidirectional prediction. In the case of mono-directional prediction, the block to predict is associated to one predictor. The location of the predictor is encoded as motion information. This motion information is constituted by an index of the reference frame containing the predictor, called ref_idx in the standard, and a vector defined by a vertical displacement and a horizontal one that gives the location of the predictor block in the referred frame. In case of bidirectional prediction, the block to encode is associated to two predictors taken in two different reference frames. As a consequence, the motion information comprises two indexes of reference frames and two vectors.

The motion information may itself be encoded in a predictive way. The motion information obtained for neighboring coding unit in the same frame may be used as spatial motion information predictors. The motion information obtained from co-located coding unit in other frames may be used as temporal motion information predictor. The motion information to be encoded for the block to encode is then encoded with an index on the motion information predictor used and residual information representing the difference between the chosen motion information predictor and the motion information to be encoded.

Prediction of motion information from motion information corresponding to previous images requires that the encoder and the decoder store the motion field of the previously encoded images. This motion field may represent a huge amount of data to store a fortiori for videos showing large resolution like 4k2k or 8k4k videos. In order to limit the storage requirements of HEVC codecs, the HEVC standard has adopted a strategy consisting in using compressed motion fields for the motion information prediction instead of the full motion field.

The storage of a motion field is required only when motion information of previous images are used. In HEVC, the use of the temporal motion information predictors can be deactivated. In that case a further reduction of the storage requirements of HEVC codec can be obtained by preventing any storage of motion information.

One of the main ideas in a scalable codec is to reuse information from a Reference Layer (RL) coded using a given codec (e.g. HEVC) so as to encode information of the Enhancement Layer.

It would be desirable to use the motion information determined in the reference layer for the predictive encoding of motion information in the enhancement layer. In particular, if the use of the temporal motion information predictors is deactivated in the reference layer, it may happen that no motion information may be available to be used for motion information prediction in the enhancement layer.

The present invention has been devised to address one or more of the foregoing concerns. It concerns the process to determine motion information predictor in the enhancement layer of a scalable encoding scheme also known as motion derivation process. It comprises a correction of the position in the reference layer used to pick-up the more relevant motion information available due to the compression scheme.

According to a first aspect of the invention there is provided a method of encoding an image according to a scalable encoding format, said encoding format comprising at least a reference layer and an enhancement layer, at least part of the image being predictively encoded based on motion information, said motion information being itself predictively encoded based on a set of motion information predictors, wherein the method comprises for at least an image area of the enhancement layer determining a set of motion information predictors based on motion information of other part of images belonging to the reference layer; determining a co-located position in the reference layer of the image area to encode in the enhancement layer in order to select motion information associated to said position to be part of said set of motion information predictors and correcting at least one coordinate X of said co-located position to a new value X' given by $X'=\lfloor((X+4)/16)\rfloor*16$, where $\lfloor((X+4)/16)\rfloor$ is a truncation of $((X+4)/16)$ to an integer value.

According to a further aspect of the invention there is provided a method of decoding an image according to a scalable encoding format, said encoding format comprising at least a reference layer and an enhancement layer, at least part of the image being predictively encoded based on motion information, said motion information being itself predictively encoded based on a set of motion information predictors, wherein the method comprises for at least an image area of the enhancement layer determining a set of motion information predictors based on motion information of other part of images belonging to the reference layer; determining a co-located position in the reference layer of the image area to encode in the enhancement layer in order to select motion information associated to said position to be part of said set of motion information predictors and correcting at least one coordinate X of said co-located position to a new value X' given by $X'=\lfloor((X+4)/16)\rfloor*16$, where $\lfloor((X+4)/16)\rfloor$ is a truncation of $((X+4)/16)$ to an integer value.

According to another aspect of the invention there is provided a device for encoding an image according to a scalable encoding format, said encoding format comprising at least a reference layer and an enhancement layer, at least part of the image being predictively encoded based on motion information, said motion information being itself predictively encoded based on a set of motion information predictors, wherein the device comprises for at least an image area of the enhancement layer a predictor determining module for determining a set of motion information predictors based on motion information of other part of images belonging to the reference layer; a position determining module for determining a co-located position in the reference layer of the image area to encode in the enhancement layer in order to select motion information associated to said position to be part of said set of motion information predictors and a position correcting module for correcting at least one coordinate X of said co-located position to a new value X' given by $X'=\lfloor((X+4)/16)\rfloor*16$, where $\lfloor((X+4)/16)\rfloor$ is a truncation of $((X+4)/16)$ to an integer value.

According to another aspect of the invention there is provided a device for decoding an image according to a scalable encoding format, said encoding format comprising at least a reference layer and an enhancement layer, at least part of the image being predictively encoded based on motion information, said motion information being itself predictively encoded based on a set of motion information predictors, wherein the device comprises for at least an image area of the enhancement layer a predictor determining module for determining a set of motion information predictors based on motion information of other part of images belonging to the reference layer; a position determining module for determining a co-located position in the reference layer of the image area to encode in the enhancement layer in order to select motion information associated to said position to be part of said set of motion information predictors and a position correcting module for correcting at least one coordinate X of said co-located position to a new value X' given by $X'=\lfloor((X+4)/16)\rfloor*16$, where $\lfloor((X+4)/16)\rfloor$ is a truncation of $((X+4)/16)$ to an integer value.

According to another aspect of the invention there is provided a computer program product for a programmable apparatus, the computer program product comprising a sequence of instructions for implementing a method according to the invention, when loaded into and executed by the programmable apparatus.

According to another aspect of the invention there is provided a computer-readable storage medium storing instructions of a computer program for implementing a method according to the invention.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

Embodiments of the invention will now be described, by way of example only, and with reference to the following drawings in which.

Figure 6:
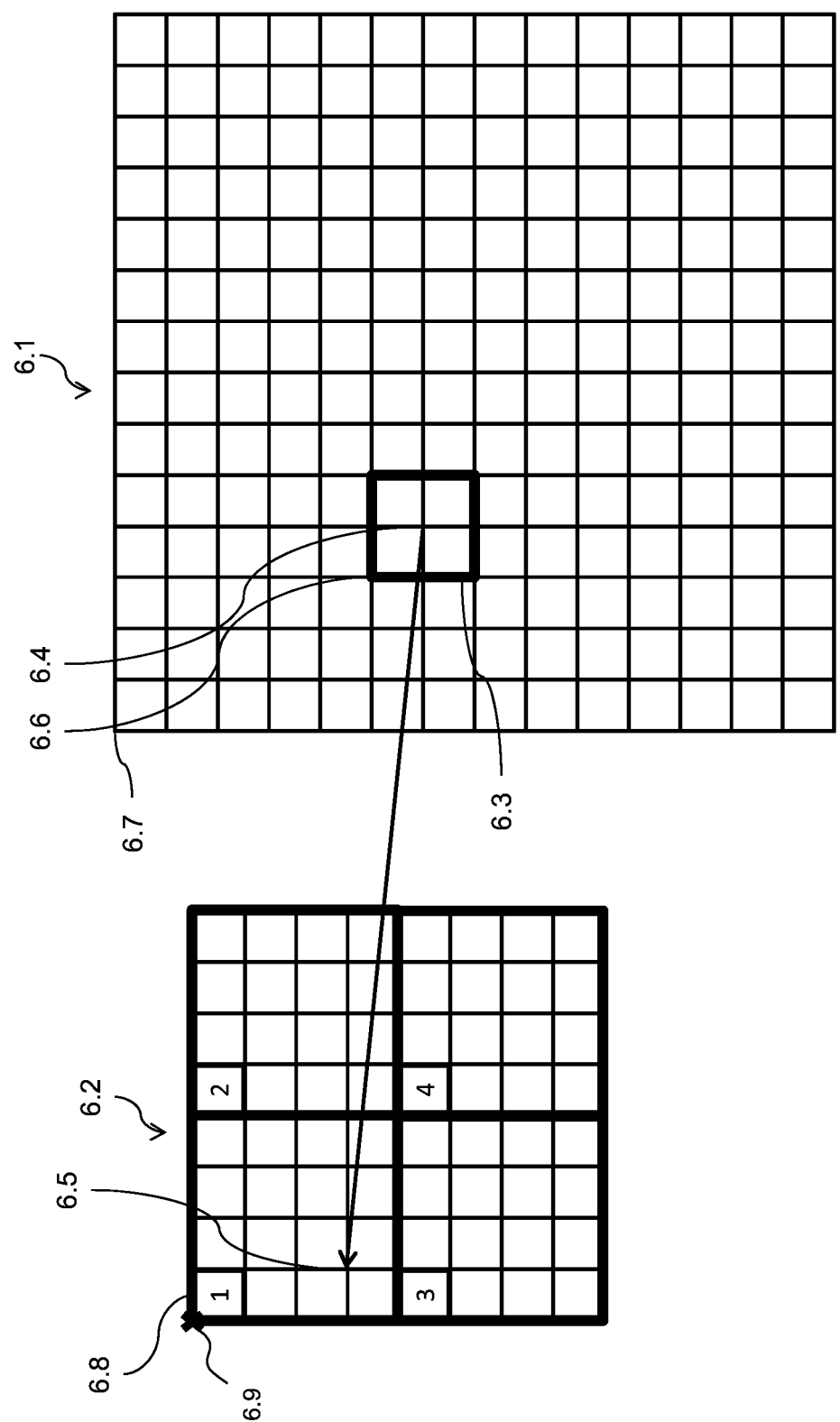
Figure 7:
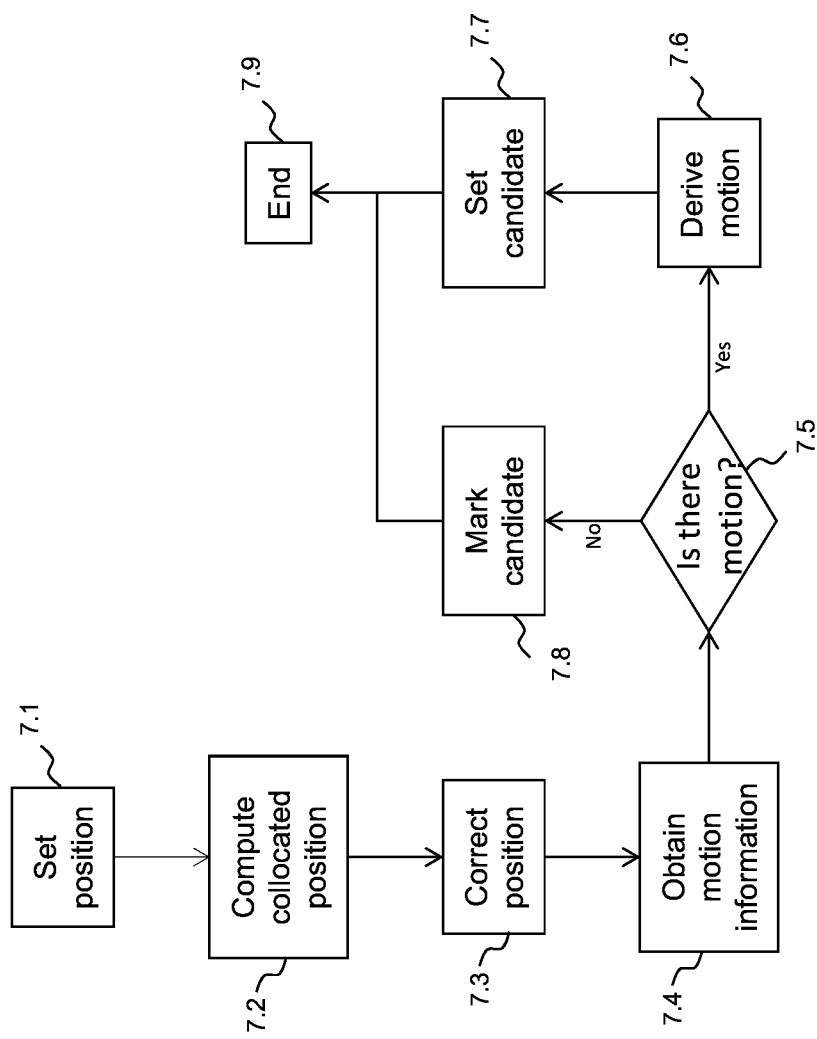
Figure 8:
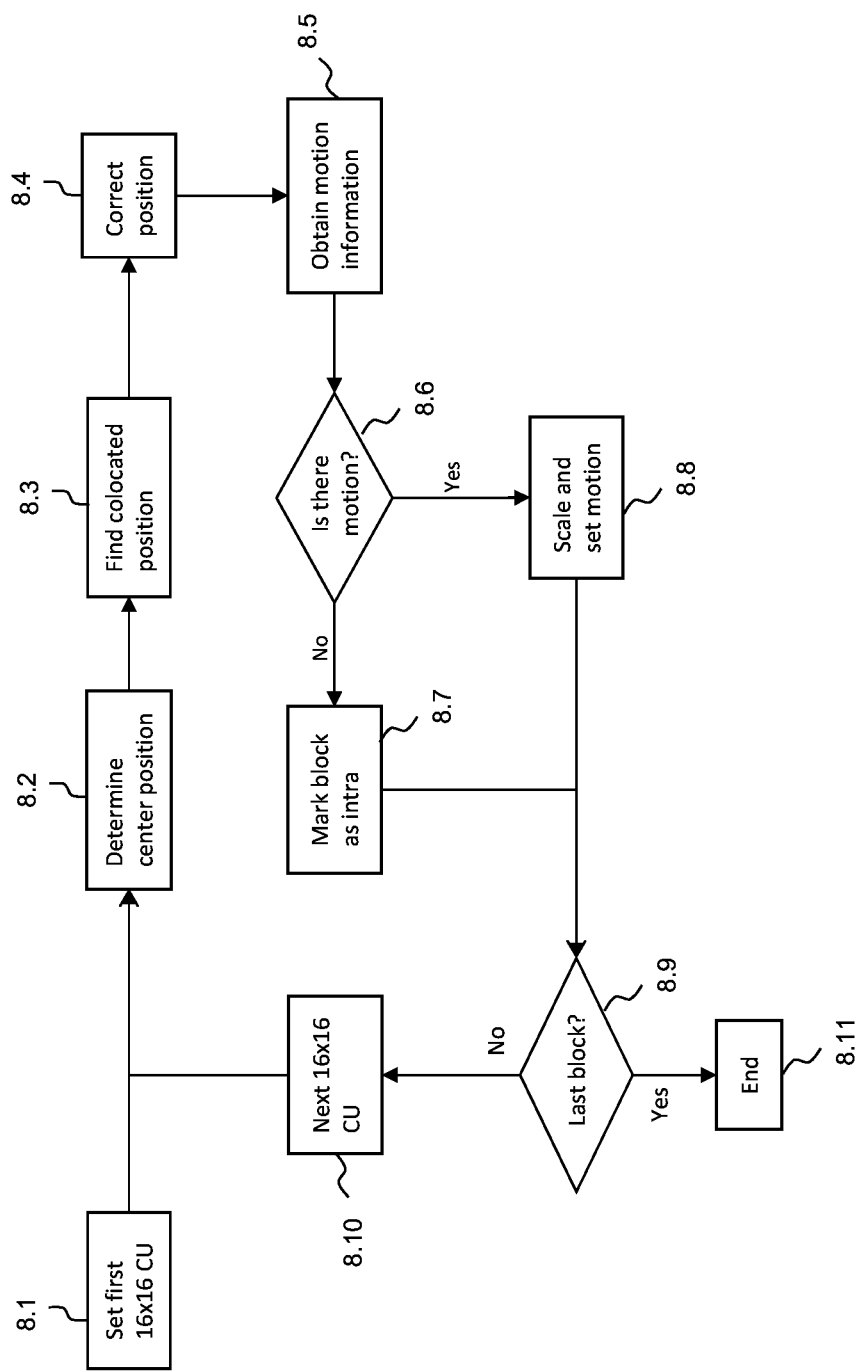
Figure 9:
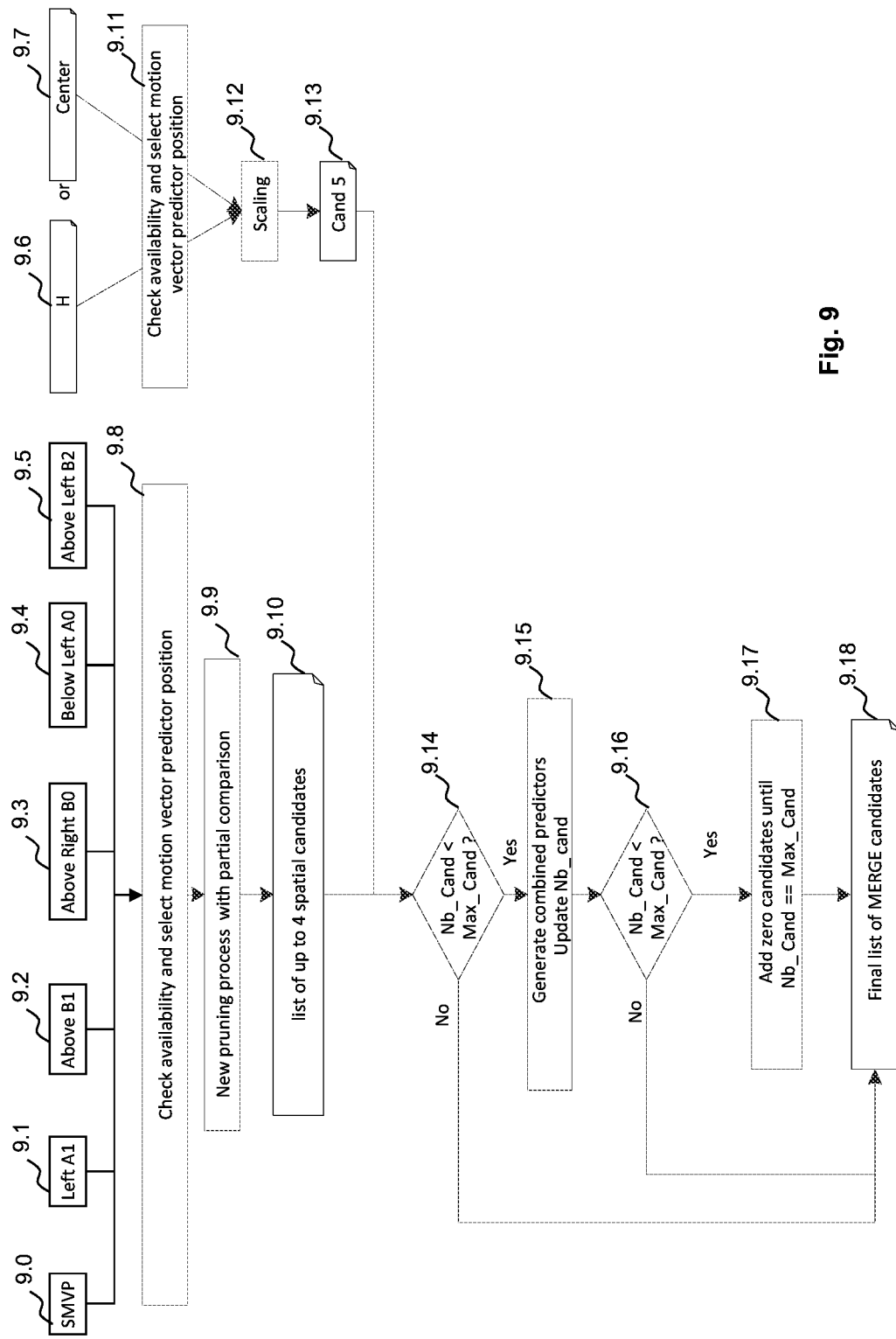
Figure 10:
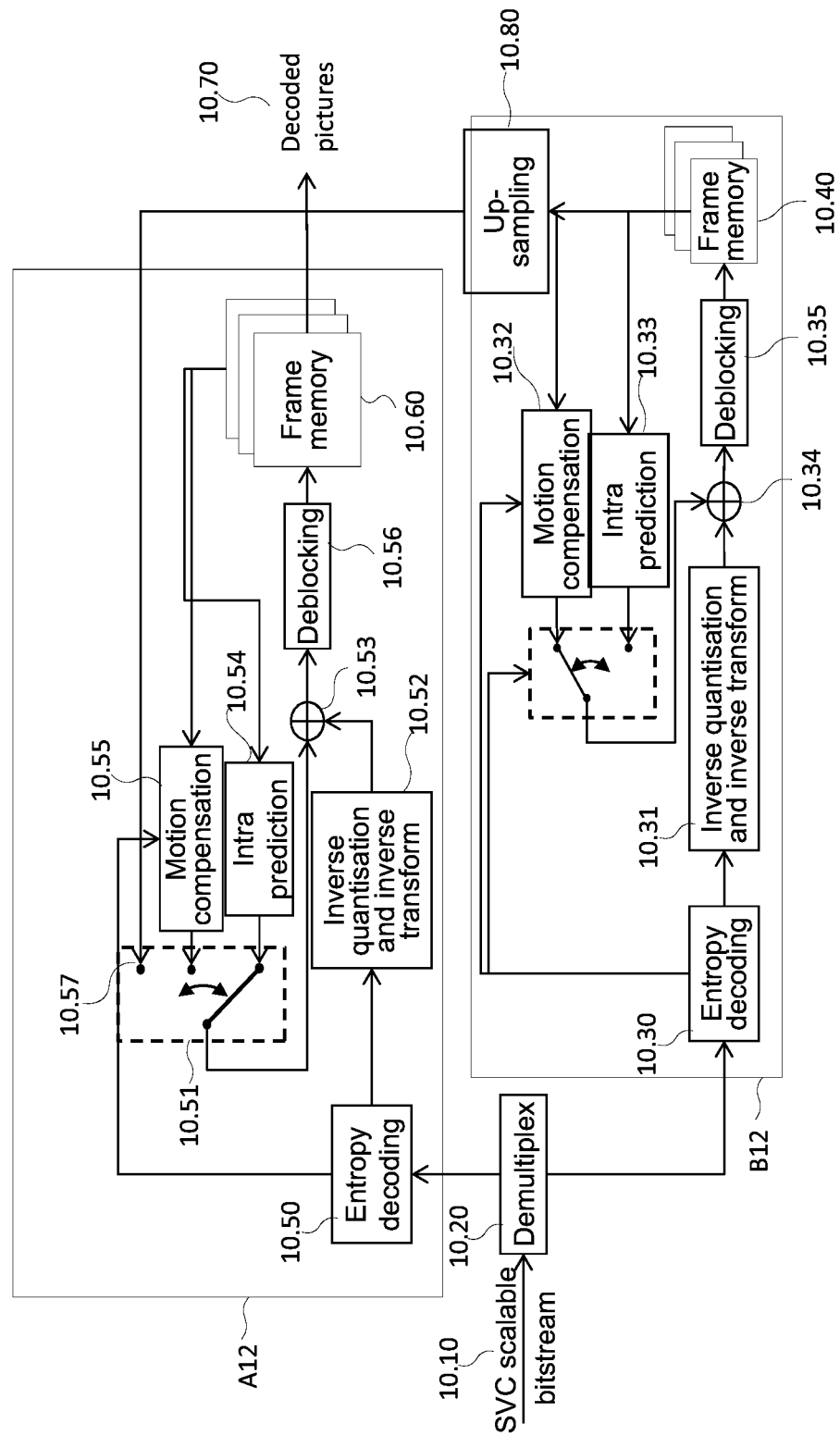
Figure 11:
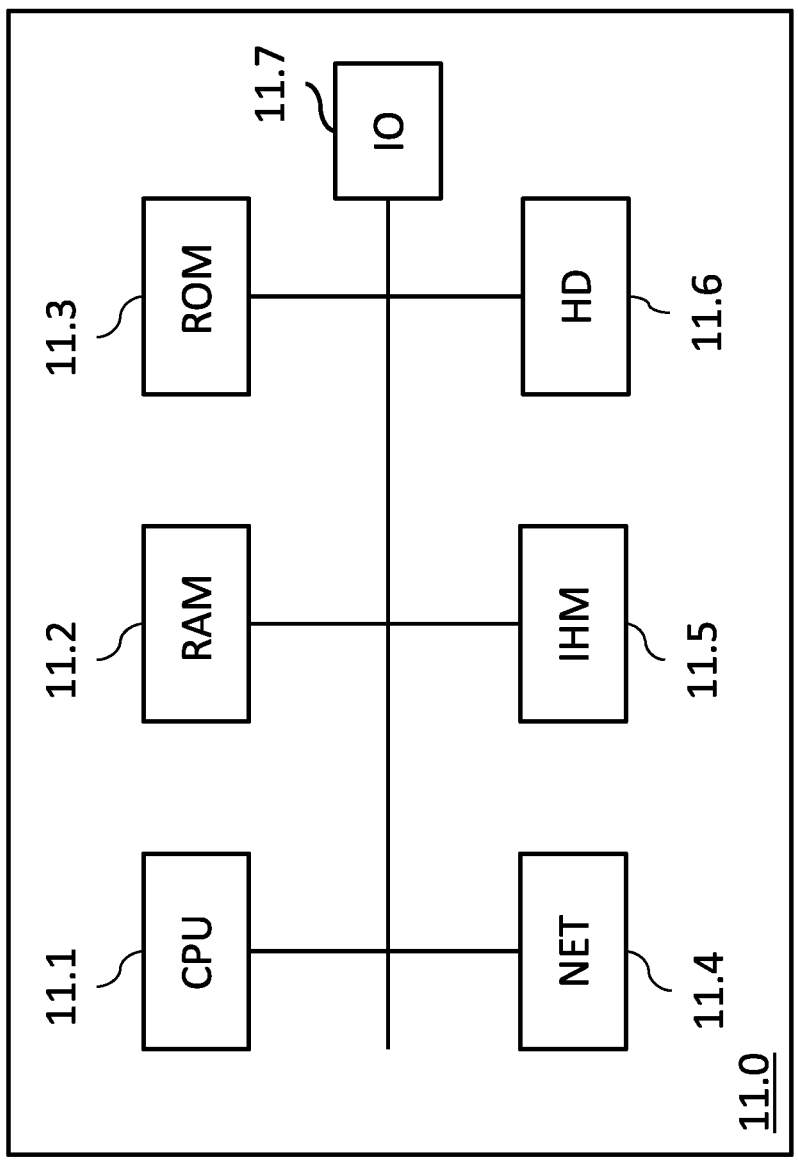
Figure 12:
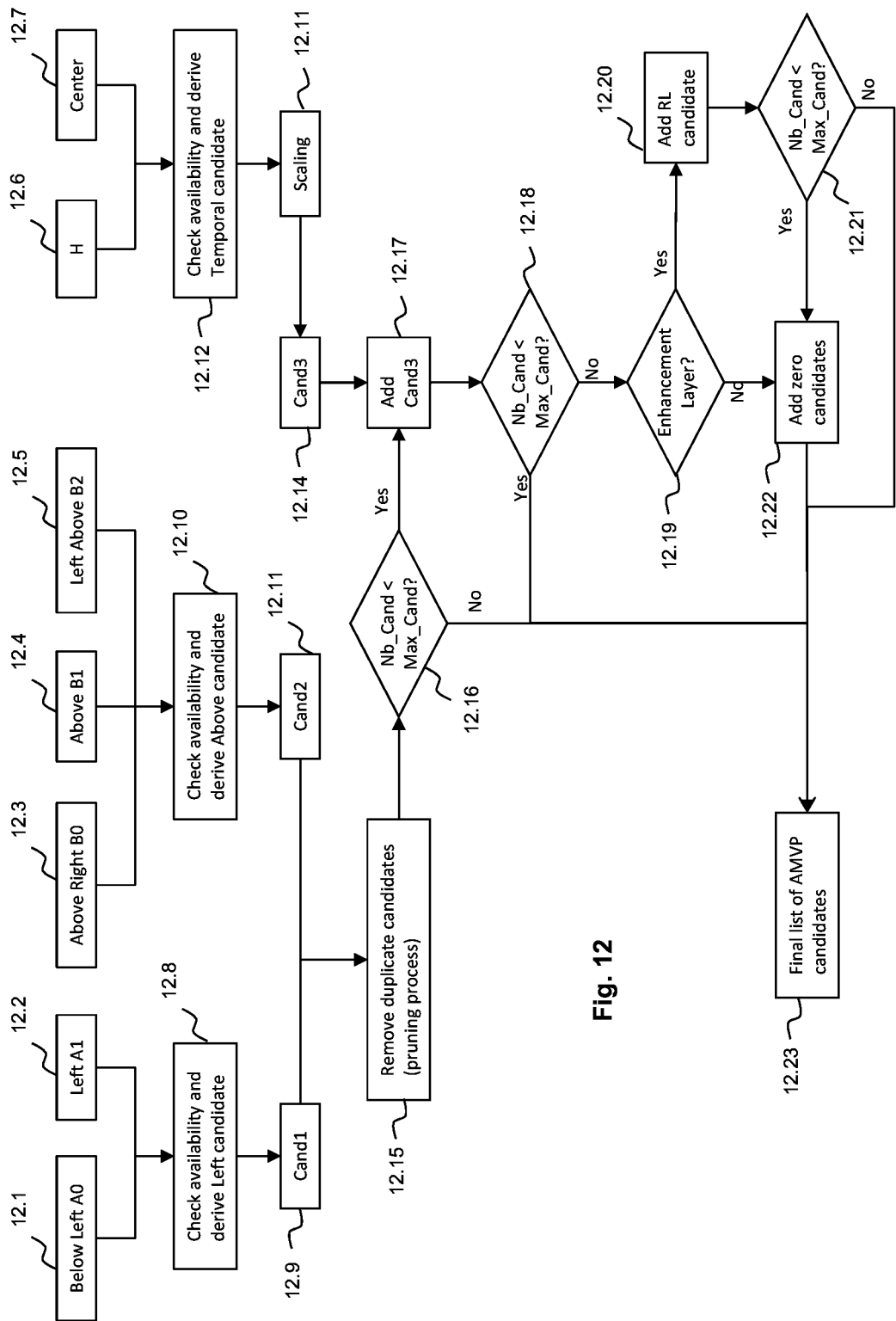
Figure 13:
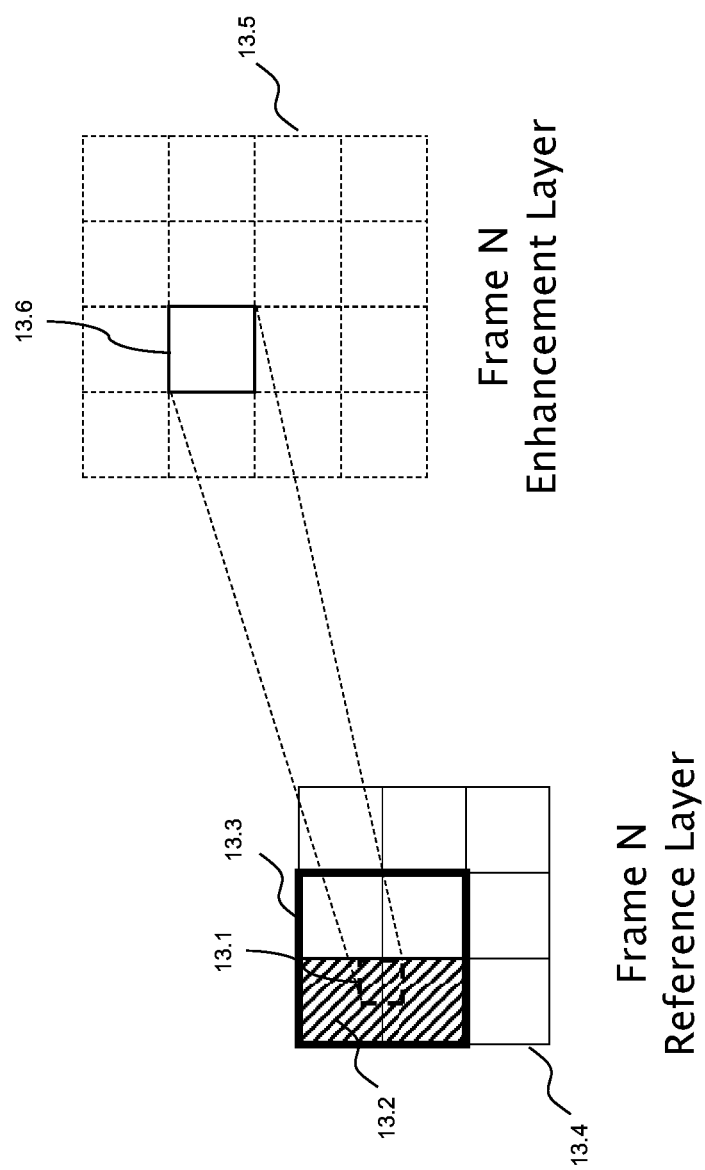

FIG. 6 schematically illustrates the principles of the TextureRL approach in an embodiment of the invention;

FIG. 7 illustrates the adapted motion information predictor derivation process in the context of the TextureRL approach both AMVP and Merge mode in the enhancement layer in an embodiment of the invention;

FIG. 8 illustrates the adapted process in the context of the reference frame index approach in an embodiment of the invention;

FIG. 9 is the flow chart of the motion information derivation process of the Merge modes in an embodiment of the invention;

FIG. 10 presents a block diagram of a scalable decoder in an embodiment of the invention;

FIG. 11 is a schematic block diagram of a computing device for implementation of one or more embodiments of the invention;

FIG. 12 shows the AMVP motion information predictors set derivation in an embodiment of the invention;

FIG. 13 illustrates the details of a memory area in an embodiment of the invention.

Figure 1:
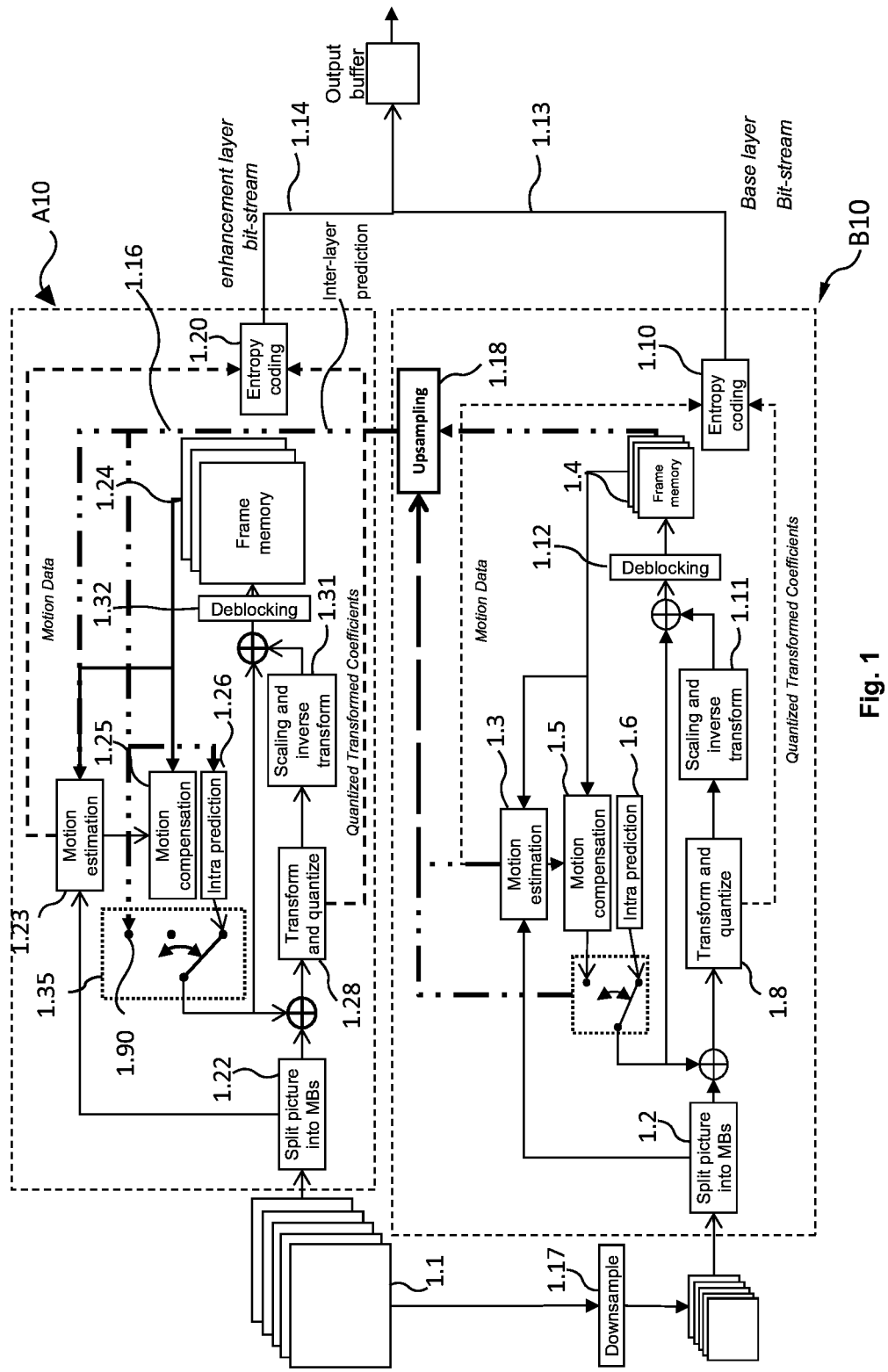
FIG. 1 illustrates a block diagram of a classical scalable video encoder.

FIG. 1 illustrates a block diagram of a classical scalable video encoder, which may comprise a number of subparts or stages and which is representative of a scalable extension of HEVC. Illustrated here are two subparts or stages A10 and B10 producing data corresponding to a base layer 1.13 and data corresponding to one enhancement layer 1.14. Each of the subparts A10 and B10 follows the principles of a standard video encoder, with the steps of transformation, quantization and entropy coding being applied in two separate paths, one corresponding to each layer.

The first stage B10 aims at encoding the H.264/AVC or HEVC compliant base layer of the output scalable stream. The input to this non-scalable encoder consists in the original sequence of frame images obtained by applying a downsampling 1.17 to images 1.1. This encoder successively performs the following steps to encode a standard video bit-stream. A picture or frame to be encoded (compressed) is divided into pixel blocks at step 1.2, called coding unit (CU) in the HEVC standard. Each block first undergoes a motion estimation operation 1.3, which comprises a search, among the reference pictures stored in a dedicated memory buffer 1.4, for reference blocks that would provide a good prediction of the block. This motion estimation step provides one or more reference picture indexes which contain the found reference blocks, as well as the corresponding motion vectors. A motion compensation step 1.5 then applies the estimated motion vectors on the found reference blocks to obtain a temporal residual block which is the difference between the motion compensated prediction block and the original block to predict. Moreover, an Intra prediction step 1.6 determines the spatial prediction mode that would provide the best performance to predict the current block. Again a spatial residual block is computed but here as the difference between the spatial predictor and the original block to predict.

Afterwards, a coding mode selection mechanism 1.7 chooses the coding mode, among the spatial and temporal predictions, which provides the best rate distortion trade-off in the coding of the current block. Depending on the selected prediction mode, the residual prediction block then undergoes a transform (DCT) and a quantization 1.8. Entropy coding 1.10 of the so-quantized coefficients QTC (and associated motion data MD) is performed. The compressed texture data 1.13 associated to the coded current block 1.2 is sent for output.

In order to improve further the coding efficiency, motion information associated to INTER blocks, which are performing a motion compensation step, are predictively encoded using neighboring blocks motion information. Neighboring blocks, in that case, comprise spatially and, optionally, temporally neighboring blocks. As a consequence, if the temporally neighboring blocks are used, motion information of previously encoded images needs to be stored to allow a prediction. In the current version of the standard, this information is stored in a compressed form by the encoder and the decoder to limit the memory usage of the encoding and decoding process. However, as mentioned before, when the temporal predictor is not used in the motion information prediction, the storage of the motion field of previous images is not necessary.

The current block is then reconstructed by inverse quantization (also called scaling) and inverse transform 1.11. This step is followed if necessary by a sum between the inverse transformed residual and the prediction block of the current block in order to form the reconstructed block. The reconstructed blocks are added to the buffer in order to form the reconstructed frame. Then this reconstructed frame is post filtered in 1.12. The reconstructed frame after this post-filter is stored in a memory buffer 1.4 called the DPB (standing for Decoded Picture Buffer) so that it is available for use as a reference picture to predict any subsequent pictures to be encoded.

Finally, a last entropy coding step is given the coding mode and, in case of an inter block, the motion data, as well as the quantized DCT coefficients previously calculated. This entropy coder encodes each of these pieces of data into their binary form and encapsulates the so-encoded block into a container called NAL unit (standing for Network Abstract Layer). A NAL unit contains all encoded coding units from a given slice. A coded HEVC bit-stream consists in a series of NAL units.

Next, the second stage A10 illustrates the coding of an enhancement layer using the base layer as reference layer. Here, this enhancement layer brings a refinement of the spatial resolution to the up-sampled base layer. As illustrated in FIG. 1, the coding scheme of this enhancement layer is similar to that of the base layer, except that for each coding unit of a current picture from the stream 1.10 being compressed, additional modes based on inter layer prediction are considered. The following modifications are typically included.

An additional mode called IntraBL 1.90 consisting in predicting a block of the enhancement layer using the up-sampled co-located block of the reference layer is added to the list of modes considered for an enhancement layer block.

Motion information prediction used in INTER modes can be modified to take into account motion information coming from a reference layer. In addition specific entropy coding of the motion information can be applied during the entropy coding step 1.20.

For those new tools, an intermediate interlayer module 1.18 can provide information (motion information, samples), possibly upsampled according to the spatial resolution change, from the reference layer to the different modules of the enhancement layer encoding such as the motion estimation module 1.23, the IntraBL mode 1.90 or the intra prediction module 1.26. In particular, in the reference frame approach, module 1.18 will upsample both sample data and motion data of the resulting frame in DPB 1.4 to match enhancement layer dimensions, and will insert the resulting data (image and its motion) into the DPB 1.24, which in turn affects the operations of 1.25 and 1.23.

FIG. 10 presents a block diagram of a scalable decoder which would apply on a scalable bit-stream made of two scalability layers, e.g. comprising a base layer and an enhancement layer. This decoding process is thus the reciprocal processing of the scalable coding process of FIG. 1. The scalable stream being decoded 10.10 is made of one base layer and one spatial enhancement layer on top of the base layer, which are demultiplexed in step 10.20 into their respective layers.

The first stage of FIG. 10 concerns the base layer decoding process B12. This decoding process starts by entropy decoding 10.30 each coding unit or block of each coded picture in the base layer. This entropy decoding 10.30 provides the coding mode, the motion information (reference pictures indexes and motion vectors of INTER coded blocks), direction of prediction for intra prediction and residual data. This residual data consists of quantized and transformed DCT coefficients. Next, these quantized DCT coefficients undergo inverse quantization and inverse transform operations 10.31. Motion compensation 10.32 or Intra prediction 10.33 data can be added to this residual through operation 10.34.

Deblocking filter step 10.35 is then applied. The so-reconstructed image is then stored in the frame buffer 10.40.

Next, the decoded motion information for INTER blocks, and the reconstructed blocks are stored into a frame buffer in the first of the scalable decoders of FIG. 10 (B12). Such frames contain the data that can be used as reference data to predict an upper scalability layer.

Next, the second stage of FIG. 10 performs the decoding of a spatial enhancement layer A12 on top of the base layer decoded by the first stage. This spatial enhancement layer decoding involves the entropy decoding of the second layer, which provides the coding modes, motion information and intra prediction information as well as the transformed and quantized residual information of blocks of the second layer.

Next step consists in predicting blocks in the enhancement picture. The choice 10.51 between different types of block prediction (INTRA, INTER or in the case of the TextureRL approach, inter-layer) depends on the prediction mode obtained from the entropy decoding step 10.50.

Concerning INTRA blocks, their treatment depends on the type of INTRA coding unit. In case of inter-layer predicted INTRA block (IntraBL coding mode) 10.57, if residual data had been encoded for the block, the result of the entropy decoding 10.50 undergoes inverse quantization and inverse transform 10.52, and then is added by operation 10.53 to the co-located block of current block in base picture, in its decoded, post-filtered and up-sampled (in case of spatial scalability) version. In case of a INTRA block, such a block is fully reconstructed, through inverse quantization, inverse transform to obtain the residual data in the spatial domain, and then INTRA prediction 10.54 to obtain the fully reconstructed block.

Concerning INTER blocks, their reconstruction involves their motion-compensation 10.55 computed from frame memory 10.60, the residual data decoding and then the addition of their decoded residual information to their temporal predictor block. In this INTER block decoding process, the motion information associated to the considered block can be decoded in a predictive way, as a refinement of the motion information of the co-located block in the base picture. This aspect will be detailed below.

As in the base layer, deblocking filter step 10.56 can be applied to the images output from 10.53, and stored in frame memory 10.60 before being returned by the decoded as fully decoded frames 10.70. Note that in an embodiment of the invention, motion compensation 10.55 actually uses data from Enhancement Layer image buffer 10.60 and Base Layer image buffer 10.40. Together with sample data, module 10.80 may be in charge of providing such data from the reference layer by upsampling it.

Two approaches for image prediction may be contemplated. More particularly, image prediction comprises motion information prediction. In both approaches, the motion information prediction is impacted, but in different ways. The two approaches of the image prediction are described below. A feature of these approaches is to allow using motion information of the reference layer for the prediction of motion information in the enhancement layer. This feature will be described in greater details in relation with FIG. 3, and affects how frame memory 1.4 on FIG. 1 of the reference layer is accessed.

Then, the case of the motion information prediction, which is the key point of this invention, is explained in detail for both approaches.

The first approach is usually called TextureRL since the usage of the IntraBL mode is allowed. This approach uses low-level syntax at the block-level to signal the use of the IntraBL mode. This approach is sometimes referred to by some experts as "IntraBL approach".

The second approach referred as reference frame insertion is to mostly use high-level changes. In particular, no syntax change is made at the blocklevel. The main feature of the reference frame index approach is to introduce images (possibly upscaled when the resolution is different) of the reference layer, referred to as ILR images (standing for Inter Layer Reference images), into the buffer of decoded images of the enhancement layer. These images are then inserted at the end of specific reference image lists (L0 and L1 list) used as reference images in the DPB (Decoded Picture Buffer). The insertion depends on the type of the current slice of the enhancement layer. In a P-slice, the ILR image is inserted at the end of the L0 list. In a B-slice, the ILR image is inserted at the end of both the L0 and L1 lists. This approach is sometimes referred to by some experts as "ref_idx approach". With this approach, the motion information of a given block may be predictively encoded using a reference layer temporal motion information predictor co-located in the reference layer.

It is worth noting that IntraBL in the TextureRL approach and the use of the inserted reference frame in the reference frame index approach are two ways to use the base layer information to predict the enhancement layer. In the description of this invention and for sake of simplicity, we are considering one of these approaches at once but not both together.

We will now describe general information regarding motion information that is valid for both approaches.

A typical video codec exploits both spatial and temporal correlations between pixels in respective Intra and Inter modes. We focus herein on the Inter modes, which exploit temporal correlation between pixels of the current frame and previously encoded/decoded frames.

In HEVC (and SHVC by extension), the "Inter" mode is a prediction mode that defines a temporal prediction direction. 0 to 2 sets of motion information are defined depending on this temporal direction. If the "Inter" prediction direction is equal to 0, the block is coded with the Intra mode, and it contains no motion information. If the "Inter" prediction direction is equal to 1, the block contains motion information from a list of reference frames called L0. If the "Inter" prediction direction is equal to 2, the block contains motion information from another list of reference frames called L1. If the "Inter" prediction direction is equal to 3, the block contains motion information from both lists L0 and L1.

The motion information consists in the following information, an index (ref_idx) in a list of reference frames and a motion vector that has two components: horizontal and vertical motion values. These values correspond to a spatial displacement in term of pixels between the position of the current block and the temporal predictor block in the reference frame. This displacement can have sub-pixel precision (0, 1, 2 or 3 quarters of a pixel).

"Inter" prediction directions 1 and 2 mentioned above correspond to unidirectional predictions, and cannot be used in I (=Infra coded slice) slices, but in P (Predicted slice) and B (Bi-predicted) slices. An image of particular type (I, P, or B) is made of at least one slice of the same type. "Inter" prediction direction 3 is called bidirectional prediction, and can only be used in B slices. In this case, two block predictors are considered, one for each list L0 and L1. Consequently, two reference frame indexes are considered as well as two motion vectors. The Inter block predictor for bi-prediction is the average, pixel at pixel, of these two blocks pointed to by these two motion vectors. The block predictor here corresponds to the notion of Prediction Unit or Prediction Block in HEVC or SHVC.

As described above, motion information in HEVC is coded by predictive coding, using a plurality of motion information predictors, among which the temporally co-located motion information. Therefore it is necessary for each frame that is used as reference frame to store at the encoder and decoder sides its related motion information. This motion information is compressed in order to reduce its size in the dedicated memory of motion information.

Figure 5:
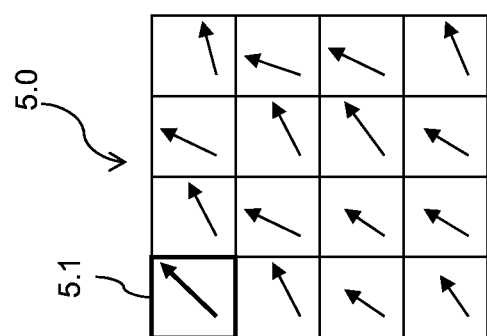
FIG. 5 illustrates the granularity of motion information in an embodiment of the invention.

HEVC therefore uses a particular granularity to represent motion. This is depicted in FIG. 5. For every block 5.0 of 16×16 pixels, the minimal granularity used by HEVC is 4×4 pixels, resulting in 16 potential pieces of motion information, one for each 4×4 block. Compression of motion information consists in keeping only the motion information corresponding to the top left 4×4 block 5.1 for a given block 5.0.

The motion information compression process can occur as soon as the final choice has been made for a 16×16 block and it has been encoded, but it is simpler to visualize it as being done once the whole image has been encoded. For simplicity sake, we can consider it to be performed after the adaptive loop filter process, and before the decoded picture is put into the decoded picture buffer (DPB). This compression process can be described as a particular look-up: for given pixel coordinates X and Y, the motion information is obtained from the position X'=(X>>4)<<4 and Y'=(Y>>4)<<4, where the '>>' and '<<' operators are described as follows.

x>>y represents arithmetic right shift of a two's complement integer representation of x by y binary digits. This function is defined only for non-negative integer values of y. Bits shifted into the MSBs as a result of the right shift have a value equal to the MSB of x prior to the shift operation.

x<<y represents arithmetic left shift of a two's complement integer representation of x by y binary digits. This function is defined only for non-negative integer values of y. Bits shifted into the LSBs as a result of the left shift have a value equal to 0.

It may be noted that some implementations may use a buffer to store the corresponding compressed motion.

In the HEVC design, motion vectors are coded by predictive coding, using a plurality of motion information predictors. For an INTER-coded block, there are 3 sub-modes, called Skip, Inter and Merge block encoding sub-modes. The Inter submode uses a particular motion prediction method called AMVP, and uses residual texture data. Skip and Merge submodes use the same motion prediction method (but the former does not use residual data). This prediction method allows the selection of the best motion information predictor from a given set, where the set is composed of spatial and temporal motion information.

We will describe the motion information prediction mode called Merge mode, and how it applies to both approaches mentioned above: TextureRL and reference frame index. This is used for 2 INTER coding submodes, the Skip and Merge submodes. Next we will detail an equivalent scheme, which may be used in AMVP mode.

Figure 3:
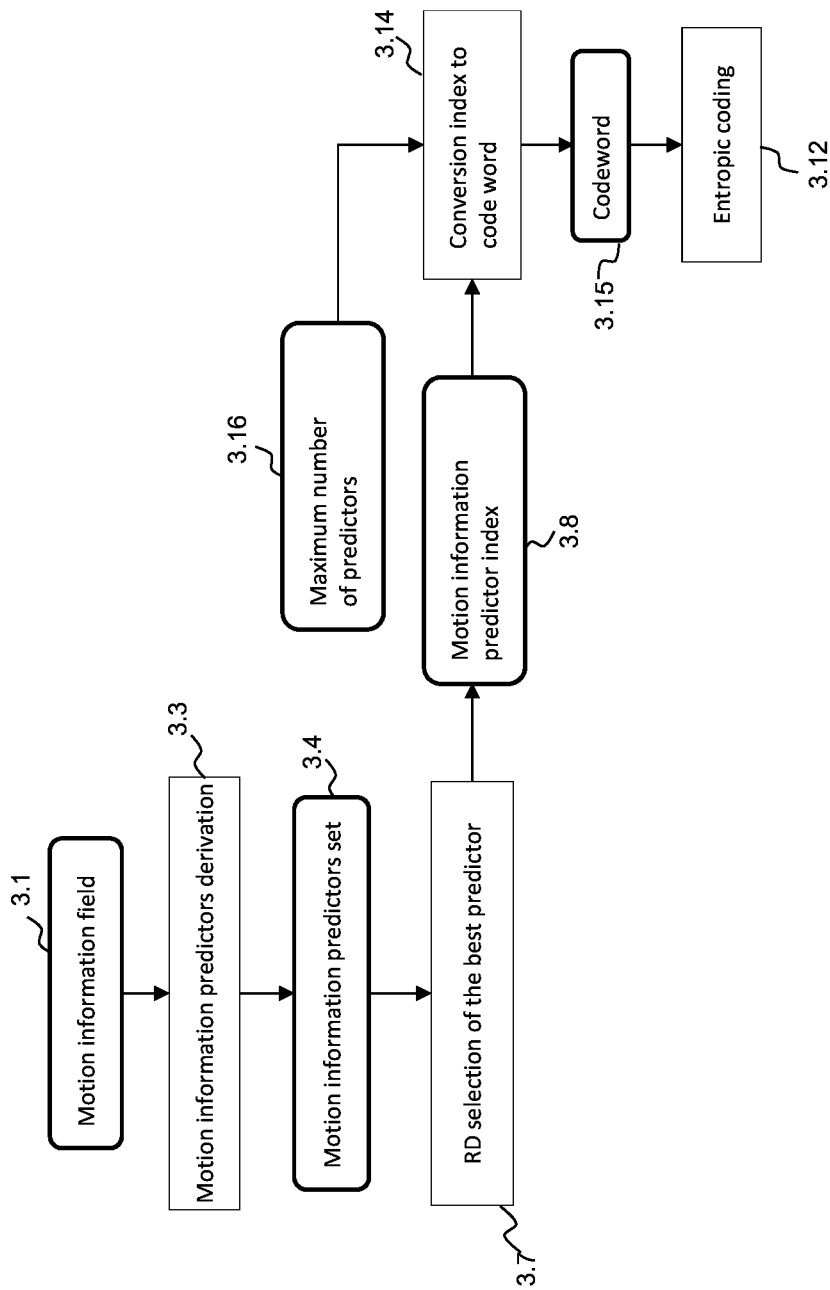
FIG. 3 illustrates prediction of motion information in the enhancement layer using motion information of the reference layer in an embodiment of the invention.

FIG. 3 shows a generic flowchart for the Merge motion information predictor scheme for the Merge and Skip sub-modes on the encoder side referred to as in short "the Merge mode". The principle of the Merge mode is to use the motion vector prediction for the motion compensation without coding any motion refinement. Motion information predictor generation module 3.3 generates the motion information predictors set 3.4 based on the motion information field 3.1 as described in detail below. The Rate/Distortion selection 3.7 of the best motion information predictor is applied among the motion information predictors set 3.4. This generates a motion vector predictor index 3.8 that is to be coded.

The conversion module 3.14 converts said index into a truncated unary code 3.15: for a value N to encode, a codeword of length N+1 is generated, except for the maximal value of N, that needs N bits instead. This code consists of N bits set to 1, and a final bit set to 0. If the N value is equal to the maximum number of candidates, then that terminal bit is not needed, and the codeword length is thus N. Because of that maximal value, the number of Merge candidates (usually 5 for HEVC), can be selected at the slice level (five_minus_max_num_Merge_cand syntax element in HEVC), step 3.14 takes into account the maximum number of predictor 3.16.

The generated codeword 3.15 is then entropy-coded by the entropy coding step 3.12:
 The first bit uses arithmetic coding with a specific context;
 The remaining bits uses bypass coding, i.e. an actual bit is generated.

Figure 4:
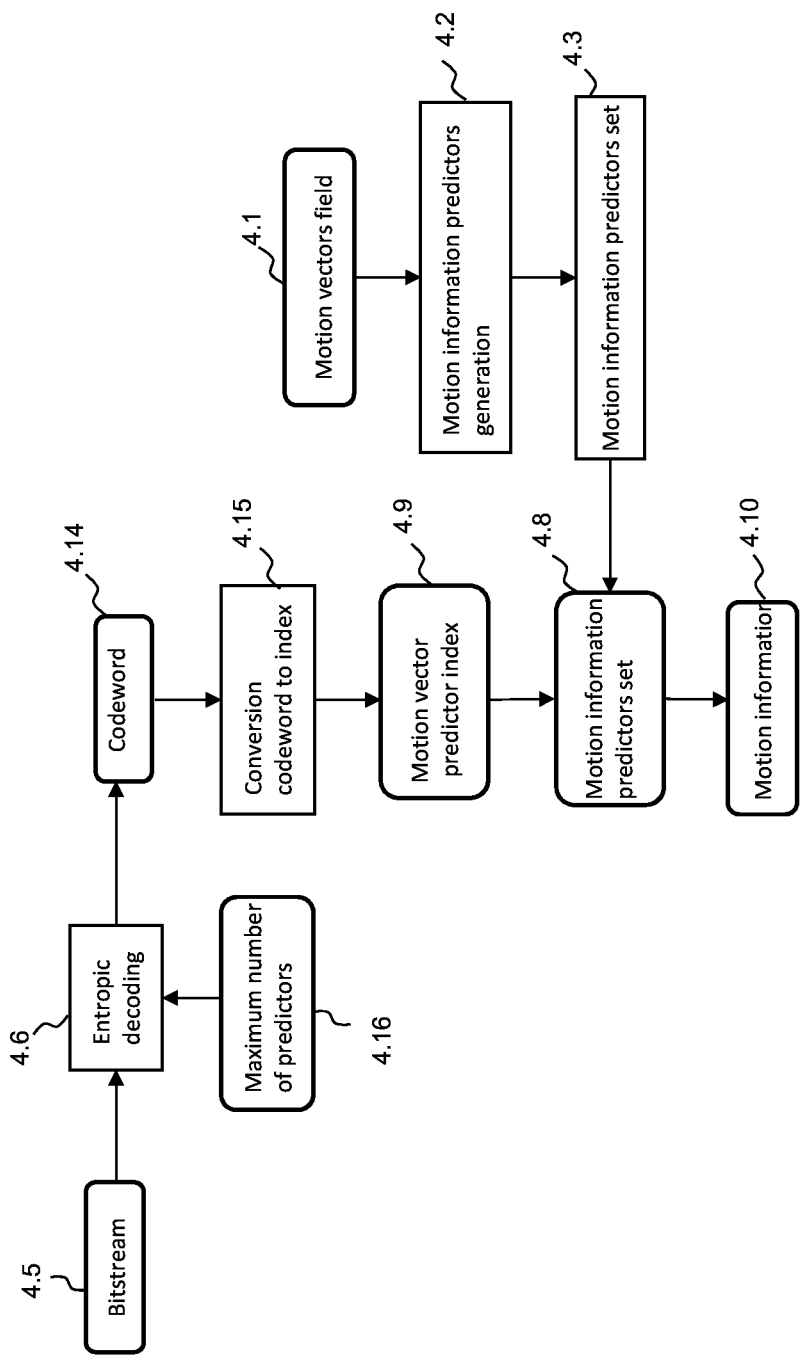
FIG. 4 illustrates the flowchart for the decoding process in an embodiment of the invention.

FIG. 4 shows the flowchart for the corresponding decoding process. In the first step, module 4.2 generates the motion information predictors set 4.8 based on the motion information field 4.1 of the current frame and of the previous frames. The maximum number 4.16 of motion predictors has been decoded from the syntax element five_minus_max_num_Merge_cand located in the slice header. It is then used in 4.6 to extract the motion information predictor codeword 4.14. This codeword is converted by step 4.15 into a predictor index 4.9. The motion information predictor 4.10 to use is then extracted from set 4.8 according to this predictor index value 4.9. This predictor is then used as the actual motion information during motion compensation.

A motion information predictor or candidate contains all the motion information: direction (i.e. availability of a motion vector and reference index within a list), reference frame index and motion vectors. Several candidates are generated by the Merge derivation process described in the following, each having an index. In HEVC, the maximum number of candidates Max_Cand is by default equal to 5, but can be reduced down to 1. We are here describing the Merge motion information predictor determination, with specific parts for the TextureRL and reference frame index approaches.

FIG. 9 is the flow chart of the motion information derivation process of the Merge modes. In the first step of the derivation in both HEVC core, TextureRL and reference frame index approaches, 7 block positions are considered, 9.1 to 9.7.

In addition, in the TextureRL approach case, another candidate, the SMVP 9.0 (where SMVP stands for Spatial Motion Vector Predictor), as described in the foregoing, is considered. These positions are the spatial and temporal positions depicted in FIG. 2. Each position has the same name in both figures. This SMVP does not exist in the reference frame index approach.

Module 9.8 checks the availability of the spatial motion information, and in the TextureRL approach, the SMVP as well for an enhancement layer. It selects at most 4 motion information predictors. In this module, a predictor is available if it exists in the reference layer and if this block is not INTRA coded. In addition, in the following, within the TextureRL approach, any candidate to be added is also compared to the SMVP in addition to any other motion information, and is actually added, only if it is different. For instance, "Left" candidate, referenced A1 or 9.1, is also compared to the SMVP and added as second if motion exists at position X2 or first otherwise. This comparison, as well as in the following, is performed by checking that:

The motion information from two candidates have the same prediction direction;
If such is the case, for each piece of motion information associated to the prediction direction:
That the same frame is referenced (ie same value of the ref_idx index);
That the motion vectors are identical both in their vertical and horizontal coordinates The selection and the check of these 5 motion vectors are described in the following conditions:

In the TextureRL approach, if the motion information 9.0 from the collocated position X2 of the center position X1 of the PU is available 9.8, it is scaled and used as the first candidate in list 9.10.
If the "Left" A1 motion information 9.1 is available 9.8, meaning that if it exists and if this block is not Intra coded, the motion information of the "Left" block is selected and used as the first candidate in list 9.10.
If the "Above" B1 motion information 9.2 is available 9.8, the candidate "Above" block is compared 9.9 to A1 (if it exists). If B1 is equal to A1, B1 is not added in the list of spatial candidates 9.10 otherwise it is added.
If the "Above Right" B0 motion information 9.3 is available 9.8, the motion vector of the "Above Right" is compared 9.9 to B1. If B0 is equal to B1, B0 is not added in the list of spatial candidates (9.10) otherwise it is added.
If the "Below Left" A0 motion vector 9.4 is available 9.8, the motion information of the "Below Left" is compared 9.9 to A1. If A0 is equal to A1, A0 is not added in the list of spatial candidates 9.10 otherwise it is added.
If the List of spatial candidate doesn't contain 4 candidates, the availability of "Above Left" B2 motion information 9.5 is tested 9.8, if it is available; the motion vector of the "Above Left" B2 is compared 9.9 to A1 and B1. If B2 is equal to A1 or B1, B2 is not added in the list of spatial candidates 9.10 otherwise it is added.

At the end of this stage, the list 9.10 contains from 0 up to 4 candidates.

Figure 2:
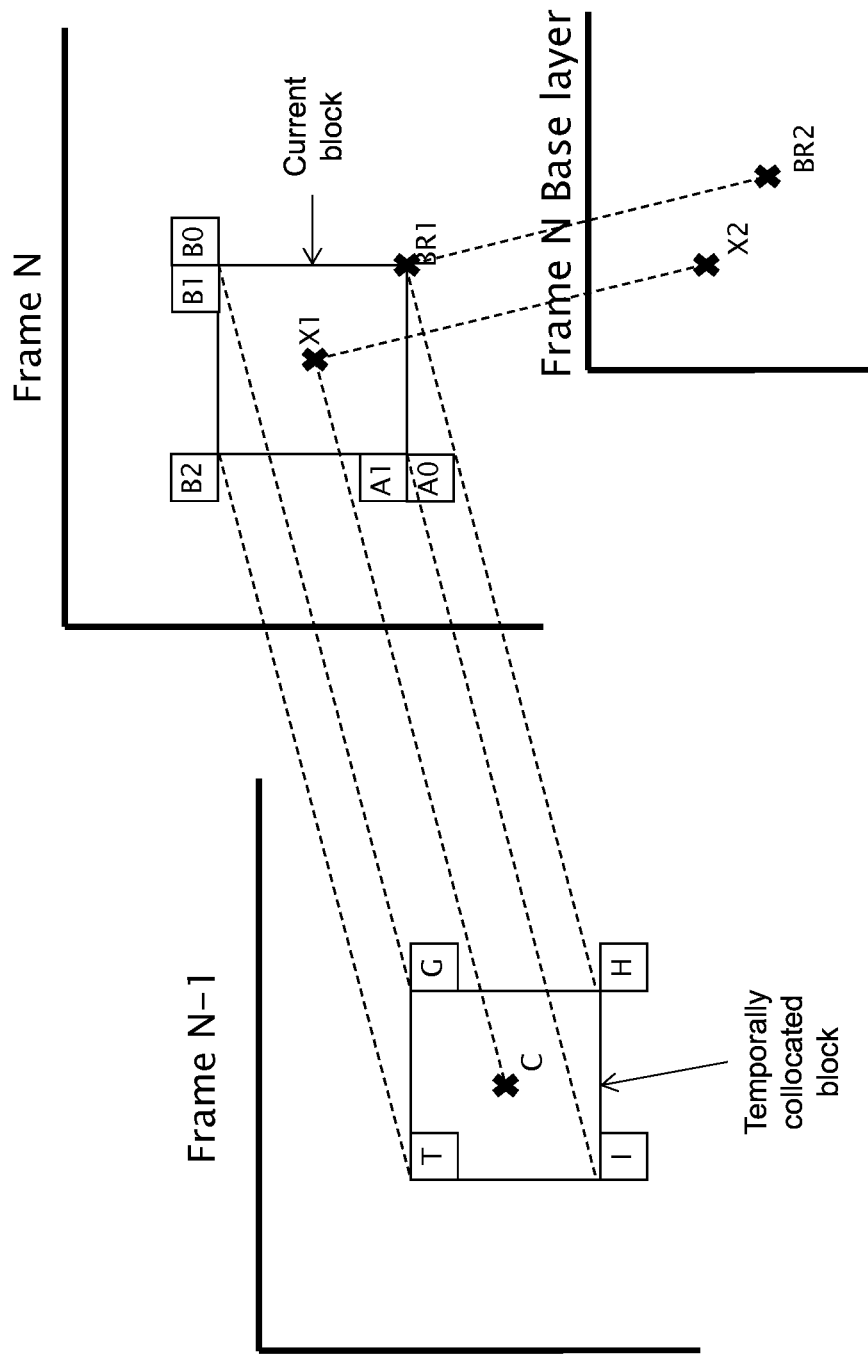
FIG. 2 illustrates spatial and temporal positions for motion information predictors in an embodiment of the invention.

For the temporal candidate, two positions can be used: H 9.6 corresponding to the bottom right position BR1 of the co-located block or the center C 9.7 of the co-located block (co-located means the block at the same position in a temporally different frame) corresponding to the center position X1 of the current block. These positions are depicted in FIG. 2.

First, the availability of the block at the H position 9.6 is checked 9.11. If it is not available, then the block at the center position 9.7 is then checked 9.11. If at least one motion information of these positions is available, this temporal motion information can be scaled if needed 9.12 to be homogeneous with motion information coming from the reference frame with index 0, for both list L0 and L1 if needed in order to create the temporal candidate 9.13; the temporal candidate is then inserted in the Merge candidates list just after the spatial candidates.

Furthermore, the final position for the temporal candidate, H or center depending on availability, is constrained to remain within the same CTB (standing for Coding Tree Block) or its right neighbor so as to reduce memory accesses.

It is important to note that, for all layers and all approaches but most importantly in the Reference Layer, this motion information predictor is conditionally determined and added depending on:

Whether said temporal motion information predictor (TMVP) is disabled at the sequence level, for example using the flag sps_temporal_mvp_enable_flag located in the SPS (standing for Sequence Parameter Set)—this is particularly relevant to an embodiment of the invention;
If it is enabled at the sequence level, whether it is disabled at the slice level, for example using the flag enable_temporal_mvp_flag located in the slice header.

The fact that this motion information predictor can be disabled, together with how it is affected by the motion vector memory compression, plays an important role in the described process and how the predictor SMVP 9.0 is derived.

Secondly, in the reference frame index approach, this temporal motion information predictor may come from the inserted frame. As will be described below, said motion information is actually derived from the Reference Layer frame compressed motion field.

If the amount of candidates (Nb_Cand) 9.14 is strictly inferior to the maximum number of candidates Max_Cand, 5 by default and at most, the combined candidates are generated in a step 9.15, otherwise the final list of Merge candidates is built in a step 9.18. The module 9.15, is used only when the current frame is a B frame, and it generates several candidates based of the available candidates in the two Merge lists in a step 9.15. This generation consists in combining one motion information of a candidate of list L0 to another motion information of a different candidate of list L1.

If the amount of candidates (Nb_Cand) 9.16 is strictly inferior to the maximum number of candidates Max_Cand, null motion information candidates with no displacement (0,0) (i.e. the motion vector values are all equal to zero) are added, step 9.17, incrementing Nb_Cand, until Nb_Cand equals Max_Cand.

At the end of this process the final list of Merge candidates is built in a step 9.18.

Current specification for SHVC (Scalable extension of HEVC) does not use a motion information predictor obtained from the Reference Layer in the AMVP mode, but this may be introduced as follows.

FIG. 12 shows the AMVP motion information predictors set derivation. This process is used to code predictively the motion information. Compared to the Merge mode, additional information must be transmitted: a prediction direction, and for each piece of motion information to transmit, a reference frame index, a predictor index and a motion information residual are also transmitted.

The predictor index depends on the number of candidates: HEVC needs to generate at maximum 2 motion information predictors. In that case Max_Cand in that figure is set equal to 2, but it can be imagined to use 3 for an enhancement layer. The first spatial candidate is selected among the left blocks A0 12.1 and A1 12.2, for positions similar to the ones for the Merge mode.

The two spatial motion information predictors of the AMVP mode are chosen among those above and among left blocks including the above corner blocks and left corner block, again as for the Merge mode. This left predictor Cand1 12.9 is selected 12.8 among the blocks "Below Left" A0 and "Left" A1. In this specific order, the following conditions are evaluated until a motion information value is found for the motion information from the same reference list and the same reference picture or the motion information from the other reference list and the same reference picture.

The above motion information predictor Cand2 12.11 is selected in a step 12.10 among "Above Right" B0 12.3, "Above" B1 12.4 and "Above left" B2 12.5 in this specific order, with the same conditions as described below. Next Cand1 and Cand2 are compared in order to remove one of these motion information predictors if they are equal 12.15. After this pruning, the number of candidates is compared to Max_Cand in a step 12.16: if equal, then the list of AMVP motion information candidates is fully determined, and process ends at step 12.23.

Otherwise, if the number of candidates is below Max_Cand, the temporal motion predictor Cand3 12.14 is derived as in the Merge mode and added if it exists in a step 12.17. To do so, the Bottom Right (H) 12.6 position is first considered in the availability check module 12.12. If it does not exist, the center of the collocated block 12.7 is selected.

Next the number of added candidates is compared again to the Maximum number of candidates in a step 12.18. If this Maximum number is reached, the final list of AMVP predictor is built in step 12.23. Otherwise, step 12.19 checks whether we are building a list for an Enhancement Layer. If not, classical list building resumes on step 12.22, where as many zero candidates as needed to reach the maximum are added to the list and therefore complete it and end on step 12.23. Otherwise, a specific processing occurs, where the SMVP candidate is obtained from Reference Layer following the computation described below. When this is done, normal processing resumes on step 12.22.

We have chosen to illustrate the use of this candidate after Cand3. It is of course obvious to imagine using it before Cand3, between Cand1 and Cand2 or between Cand2 and Cand3. In all cases, an additional comparison may be performed in the pruning process to take into account the new candidate SMVP.

When considering applying the Merge mode to the TextureRL approach, the Merge mode adds a new motion information predictor, the SMVP, in the Enhancement Layer obtained from its Reference Layer. Said motion information predictor currently comes from the motion information used in determining the temporal candidate in the Reference Layer, which is compressed. The FIG. 6 schematically illustrates the principles of the TextureRL approach. The description here refers to the Luma color component of the image, but the process applies to the chroma color components too.

In the FIG. 6 is represented an enhancement layer image 6.1 and its reference layer image 6.2, with a spatial ratio of R (typically 1, 1.5 or 2) between 6.1 and 6.2. Whatever the value of R, we use the word "upscaling" as the resampling process applied on a reference layer to match the enhancement layer dimensions. If R equals 1, the resampling produces an output identical to the input. The reverse resampling is called "downscaling". The enhancement layer image is subdivided into a grid representing the granularity of the image. Each one of the smaller squares is called a sample in the following text.

Now, for a given predictor unit 6.3, represented with a bold line square, the process consists in:

A. Computing the center location 6.4 (xPCtr, yPCtr) of the considered luma prediction block 6.3 which is derived as follows $xPCtr=xP+nPbW/2$ $yPCtr=yP+nPbH/2$ xP, yP specifying the top-left sample 6.6 of the current luma prediction block relative to the top-left luma sample 6.7 of the current picture nPbW and nPbH specifying the width and the height of the luma prediction block B. Downscale its coordinates according to the scaling factor R (1, 1.5 and 2.0) to find the colocated position 6.5 in the reference layer image 6.2;

$xPCtrRL=(xPCtr*PicWRL+ScaledW/2)/ScaledW$ $yPCtrRL=(yPCtr*PicHRL+ScaledH/2)/ScaledH$ The variables PicWRL and PicHRL are set equal to the width and height of the reference layer picture.

The value of ScaledH takes the value of R*PicHRL and the value of ScaledW is equal to the value of R*PicWRL.

C. Retrieve the motion information at that location from the reference layer image 6.2 by identifying a luma prediction block bIPb 6.8, numbered 1, covering the modified location given by ((xPCtrRL>>4)<<4, (yPCtrRL>>4)<<4) inside the reference layer picture. This corresponds to the motion summarization step of the Reference Layer.

The luma location (xPRL, yPRL) is then set equal to the top-left sample 6.8 of the collocated luma prediction block specified by bIPb relative to the top-left luma sample of the reference layer picture D. If the corresponding information is not intra, extract the motion vectors $MV_{RL}$ and upscale them according to the ratio R. The operation, basically, generates the spatial motion vector whose value SMVP is equal to: $SMVP=md(R*MV_{RL}(md(xPRL/R), md(yPRL/R))$ where md(.) represents a rounding process). Together with the reference frame indices associated to this spatial motion vector, this constitutes the spatial motion vector predictor inserted at the start of the set.

Current SHVC design for the TextureRL mandates that the motion vectors for the reference layer $MV_{RL}$ values are obtained from the motion compression buffer of the Reference Layer, as seen with the step C above. This is needed because the motion information corresponding to 4×4 block 6.8 is the only one kept for the whole 16×16 block by the motion information compression process.

Considering now the reference frame index approach, in that case, the motion information of the new frame, which is inserted in the reference list of the Enhancement Layer, comes from said compressed motion information field too. That motion information can then be used to determine the temporal predictor as described above.

Let us detail how this motion is derived. For a given 16×16 block, the center of that block is selected, and this position is used equivalently to what is described above to find the corresponding motion information. We are going to detail the corresponding steps for luma component. Please note that most parts are essentially identical to the process described in relation to FIG. 6 and definitions remain the same for identical variables. Those are:

A. The center location (xPCtr, yPCtr) of the luma prediction block is derived as follows (the variables' names are defined in the previous section):

$xPCtr=xP+8$ $yPCtr=yP+8$

B. Downscale its coordinates according to the scaling factor R (1, 1.5 and 2.0) to find the co-located position in the reference layer image;

$xPCtrRL=(xPCtr*PicWRL+ScaledW/2)/ScaledW$ $yPCtrRL=(yPCtr*PicHRL+ScaledH/2)/ScaledH$ The variables PicWRL and PicHRL are set equal to the width and height of the reference layer picture.
The value of ScaledH takes the value of R*PicHRL and the value of ScaledW is equal to the value of R*PicWRL.

C. The co-located position (xRL, yRL) is derived as follows $xRL=(xRef>>4)<<4$ $yRL=(yRef>>4)<<4$ D. The reference layer motion vector is derived as follows. The operation, basically, generates the motion vectors of the reference layer RL_MV value as follows:
RL_MV=md(R*MV(md(xPRL/R), md(yPRL/R))).

This information is then used as if it was the output of the motion information compression. This allows using the motion information from the reference layer to predict motion information in the enhancement layer. Contrary to the TextureRL approach, the motion information has coarser granularity but can be used as a temporal motion information predictor, both in the Merge list determination process or the AMVP one used for inter blocks.

Now that we have presented the overall architecture of a scalable codec, the two approaches and how they use motion information for prediction, we can summarize the following.

In the TextureRL approach, a new motion information predictor in the Enhancement Layer is obtained from its Reference Layer. Said motion information predictor typically comes from the motion information used in determining the temporal candidate in the Reference Layer, which is compressed. Therefore the compression impacts its derivation, and thus the Merge mode. In AMVP mode, if a scalable candidate is present, then the compression would also impact it. The AMVP and merge modes in the reference frame index approach are always impacted, because they also use the temporal motion vector predictor and, if the frame referenced is the one inserted, then this predictor would come from the motion of the Reference Layer frame.

In the reference frame index approach, the motion information of the new frame, which is inserted in the reference list of the Enhancement Layer, comes from said compressed motion information too.

As explained in relation to FIG. 6, the motion information stored for the reference layer is compressed. This means that for a complete 16×16 block, where initially up to 16 pieces of motion information exist, one for each 4×4 block contained within the 16×16 block, only one is kept, typically the one relative to the top left 4×4 block.

In the process of derivation of motion information predictors when reference layer motion information is needed, due to this compression the motion information used is the one available, namely the motion information associated with the top left 4×4 block. Referring again to FIG. 6, when looking for the motion information associated with the co-located point 6.5 corresponding to the center 6.4 of the coding unit to encode, the motion information associated with the top left 4×4 block 6.8 numbered 1 is used. It may be noted that the motion information associated with the top left 4×4 block numbered 3, corresponding to the motion information kept after compression for the 16×16 block situated below, is nearer to the position of the co-located point 6.5 and is therefore likely to be more relevant than the motion information of 4×4 block 6.8.

This non optimal choice of the motion information due to the compression process applied to the motion information in the reference layer may be measured to cause a loss of coding efficiency. In an embodiment of the invention, the motion information predictor derivation process is adapted to overcome this position problem.

FIG. 7 details the adapted process in the context of the TextureRL approach. It may be applied in both AMVP and Merge derivation process in an enhancement layer. This modified merge derivation process can be located on motion estimation module 1.23 of FIG. 1 of the encoder, and motion estimation module 10.55 in FIG. 10 of the decoder. Essentially, all of this occurs when determining the SMVP candidate 9.0 in FIG. 9.

Step 7.1 initializes the process by computing the position for which to determine motion in the reference layer, for instance by setting the current predictor unit information (dimensions/position) and deriving the center of said predictor unit. The main adaptation lies in step 7.3, which corrects the position. This is firstly made through the 2 following possibilities.

In a first embodiment, for a given coordinate X obtained for the position in the reference layer, for example either xPCtrRL or yPCtrRL described above, compute the new value by performing a rounding operation according to two parameters r and M.

For example, the new value X' may be computed as follow:

$X'=\lfloor((X+r)/M)\rfloor*M;$ where $\lfloor x \rfloor$ represents the truncating of x, meaning taking its integer part. M can be a power of 2, in this embodiment, M=16 to match HEVC compressed motion granularity. In this embodiment, r=4 and not the more natural choice r=8 is used as it provides better coding efficiency.

The same may be applied to the other coordinate. As a comparative example only, it is possible to choose different values of the parameters r and M.

In a comparative example, the correction of the position may be based on a lookup table. In that case, given coordinates (X,Y), a table of corrections F[X,Y] may be defined for at least one of the coordinates. This table may be different for each coordinate. The table may also be indexed only by one of the coordinates, namely X or Y. The table may also be reduced by using as an index a value relative to the coordinate instead of the coordinate itself, for example the correction may be obtained by F[X modulo M] instead of F[X], where M=$2^N$ as a typical value. In one example, M=16.

In all cases, the corrective value (whether a value of r or a table for at least one component) may be transmitted in and retrieved from high-level syntax information, for instance in the Video Parameter Set, Sequence Parameter Set, Picture Parameter Set, or slice header. In the case of transmitting at least one value of r:

A bit flag can indicate whether the value of r is a first value or a second, for instance 0 and 4 (in which case it can be seen as a on/off flag for the correction);

A code can indicate the explicit value of r, for instance an truncated unary code representing the value of r minus 4, e.g. binary sequences '0' for r=4, '10' for R=5, '110', '1110' and '1111' for the other values.

It is important to note in the above that only one coordinate may be affected, in particular the abscissa, as modifying the ordinate could lead to retrieving motion information from different memory area and thus causing additional memory accesses.

Following on this requirement of reducing memory accesses, at least one corrected value may be changed to another value, this other value possibly being the original value, if said corrected value does not match a criterion, such as satisfying a threshold. Said threshold may be the image dimension along that coordinate, so that no lookup may occur outside the image. Alternatively, said threshold may be the limit of a memory area along that coordinate. The memory area typically corresponds to a predetermined set of the largest coding unit in the reference layer. This memory area will be illustrated with further details with FIG. 13.

Then normal predictor determination resumes on step 7.4. The motion information is retrieved from the compressed motion buffer using the output position of step 7.3. If it is intra (i.e. there is no motion), the candidate is marked as such in step 7.8, in particular not computing nor adding any predictor to the merge candidate list, therefore ending the derivation process at step 7.9. Otherwise, the corresponding motion is upscaled to match the enhancement layer dimensions.

FIG. 8 illustrates the adapted process in the context of the reference frame index approach. It may be applied in both AMVP and Merge derivation process in an enhancement layer This adapted process is located at either the frame buffer 1.24 or in the motion estimation module 1.23 at the encoder on FIG. 1, and frame buffer 10.60 or the motion estimation module 10.55 of the decoder on FIG. 10. Indeed, it affects the content of the frame memory concerning compressed motion information.

Therefore step 8.1 initializes the motion information predictor derivation process by setting the current 16×16 block to the first one in the enhancement layer image. In step 8.2, the position of the center of the 16×16 coding unit is determined, and the corresponding co-located position in the reference layer is found on step 8.3. The new step 8.4 where the position found is corrected. One can refer to step 7.1 above to see the details of that correction, the same applies here.

On step 8.5, it is verified whether the motion at that position is intra. If yes, then the 16×16 block motion is set as intra on step 8.7, otherwise, motion vectors are obtained and upscaled to match the enhancement layer dimensions, and the upscaled motion vectors, reference indices and availabilities are set as the motion information predictors of the current 16×16 block on step 8.8.

Step 8.9 prepares for the next iteration by verifying whether current block is the last one in the image. If this is the case, then the motion information for the new frame is completely determined, and process ends at step 8.11.

Otherwise, current block is set to the next 16×16 block on step 8.10, and the iteration loops back to step 8.2.

FIG. 13 illustrates the details of what we define as a memory area. Given a Reference Layer image 13.4 and its associated Enhancement Layer image 13.5, one can define an area 13.6 for which to apply the motion determination process, for instance a CTB. Memory access restriction may apply (for instance in case of pipelined encoder or decoding where Enhancement Layer CTBs are processed right after the co-located Reference Layer CTBs), and thus we can define in a first aspect of the invention a colocated area 13.1 inside of the Reference Layer frame 13.4. The memory area mentioned in steps 7.1 and 8.4 is corresponds a first aspect to area 13.2 containing 13.1, here made of 2 CTBs of the Reference Layer: the corrected positions found for any part of 13.6 must remain within area 13.2. In a less restrictive way, we can enforce that the memory area may comprise an additional column of CTBs to the right of area 13.2, resulting in area 13.3. It may be understood that the constraint here is based on 13.6, but any size of area in the Enhancement Layer, or augmented memory area in the Reference Layer may be used.

FIG. 11 is a schematic block diagram of a computing device 11.0 for implementation of one or more embodiments of the invention. The computing device 11.0 may be a device such as a micro-computer, a workstation or a light portable device. The computing device 11.0 comprises a communication bus connected to:

a central processing unit 11.1, such as a microprocessor, denoted CPU;

a random access memory 11.2, denoted RAM, for storing the executable code of the method of embodiments of the invention as well as the registers adapted to record variables and parameters necessary for implementing the method for encoding or decoding at least part of an image according to embodiments of the invention, the memory capacity thereof can be expanded by an optional RAM connected to an expansion port for example;

a read only memory 11.3, denoted ROM, for storing computer programs for implementing embodiments of the invention;

a network interface 11.4 is typically connected to a communication network over which digital data to be processed are transmitted or received. The network interface 11.4 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 11.1;

a user interface 11.5 may be used for receiving inputs from a user or to display information to a user;

a hard disk 11.6 denoted HD may be provided as a mass storage device;

an I/O module 11.7 may be used for receiving/sending data from/to external devices such as a video source or display.

The executable code may be stored either in read only memory 11.3, on the hard disk 11.6 or on a removable digital medium such as for example a disk. According to a variant, the executable code of the programs can be received by means of a communication network, via the network interface 11.4, in order to be stored in one of the storage means of the communication device 11.0, such as the hard disk 11.6, before being executed.

The central processing unit 11.1 is adapted to control and direct the execution of the instructions or portions of software code of the program or programs according to embodiments of the invention, which instructions are stored in one of the aforementioned storage means. After powering on, the CPU 11.1 is capable of executing instructions from main RAM memory 11.2 relating to a software application after those instructions have been loaded from the program ROM 11.3 or the hard-disc (HD) 11.6 for example. Such a software application, when executed by the CPU 11.1, causes the steps of the flowcharts shown in FIGS. 1 to 4 to be performed.

Any step of the algorithm shown in FIG. 7 may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of encoding an image according to a scalable format, said format using a reference layer picture and a resampled picture, an image area of the image being predictively encoded based on motion information, said motion information being itself predictively encoded based on a motion information predictor from a set of motion information predictor candidates, wherein the method comprises, for an image area of a resampled picture:

determining a position in the reference layer picture using a position in the image area of the resampled picture; and determining a set of motion information predictor candidates including a motion information predictor candidate based on motion information associated with an image area belonging to the reference layer picture, wherein the determining the position comprises:

deriving a center position in the image area of the resampled picture;

deriving, in the reference layer picture, a corresponding position of said center position; and deriving a value X' from at least one coordinate X of the corresponding position using $X'=((X+4)>>4)<<4$, and the determining the set of motion information predictor candidates comprises selecting, if available, motion information associated with the determined position in the reference layer picture, the determined position indicated by the value X', as the motion information predictor candidate to be included in said set of motion information predictor candidates.

2. A device for encoding an image according to a scalable format, said format using a reference layer picture and a resampled picture, an image area of the image being predictively encoded based on motion information, said motion information being itself predictively encoded based on a motion information predictor from a set of motion information predictor candidates, wherein the device comprises, for an image area of a resampled picture:

a position determining unit configured to determine a position in the reference layer picture using a position in the image area of the resampled picture; and a predictor determining unit configured to determine a set of motion information predictor candidates including a motion information predictor candidate based on motion information associated with an image area belonging to the reference layer picture, wherein the determining the position, by the position determining unit, comprises:

deriving a center position in the image area of the resampled picture;

deriving, in the reference layer picture, a corresponding position of said center position; and deriving a value X' from at least one coordinate X of the corresponding position using $X'=((X+4)>>4)<<4$, and the determining the set of motion information predictor candidates, by the predictor determining unit, comprises selecting, if available, motion information associated with the determined position in the reference layer picture, the determined position indicated by the value X', as the motion information predictor candidate to be included in said set of motion information predictor candidates.

3. A method of decoding an image according to a scalable format, said format using a reference layer picture and a resampled picture, an image area of the image being predictively decoded based on motion information, said motion information being itself predictively decoded based on a motion information predictor from a set of motion information predictor candidates, wherein the method comprises, for an image area of a resampled picture:

determining a position in the reference layer picture using a position in the image area of the resampled picture; and determining a set of motion information predictor candidates including a motion information predictor candidate based on motion information associated with an image area belonging to the reference layer picture, wherein the determining the position comprises:

deriving a center position in the image area of the resampled picture;

deriving, in the reference layer picture, a corresponding position of said center position; and deriving a value X' from at least one coordinate X of the corresponding position using X'=((X+4)>>4)<<4, and the determining the set of motion information predictor candidates comprises selecting, if available, motion information associated with the determined position in the reference layer picture, the determined position indicated by the value X', as the motion information predictor candidate to be included in said set of motion information predictor candidates.

4. A device for decoding an image according to a scalable format, said format using a reference layer picture and a resampled picture, an image area of the image being predictively decoded based on motion information, said motion information being itself predictively decoded based on a motion information predictor from a set of motion information predictor candidates, wherein the device comprises, for an image area of a resampled picture:

a position determining unit configured to determine a position in the reference layer picture using a position in the image area of the resampled picture; and a predictor determining unit configured to determine a set of motion information predictor candidates including a motion information predictor candidate based on motion information associated with an image area belonging to the reference layer picture, wherein the determining the position, by the position determining unit, comprises:

deriving a center position in the image area of the resampled picture;

deriving, in the reference layer picture, a corresponding position of said center position; and deriving a value X' from at least one coordinate X of the corresponding position using X'=((X+4)>>4)<<4, and the determining the set of motion information predictor candidates, by the predictor determining unit, comprises selecting, if available, motion information associated with the determined position in the reference layer picture, the determined position indicated by the value X', as the motion information predictor candidate to be included in said set of motion information predictor candidates.

5. A non-transitory computer readable carrier medium comprising processor executable code for performing a method of encoding an image according to a scalable format, said format using a reference layer picture and a resampled picture, an image area of the image being predictively encoded based on motion information, said motion information being itself predictively encoded based on a motion information predictor from a set of motion information predictor candidates, wherein the method comprises, for an image area of a resampled picture:

determining a position in the reference layer picture using a position in the image area of the resampled picture; and determining a set of motion information predictor candidates including a motion information predictor candidate based on motion information associated with an image area belonging to the reference layer picture, wherein the determining the position comprises:

deriving a center position in the image area of the resampled picture;

deriving, in the reference layer picture, a corresponding position of said center position; and deriving a value X' from at least one coordinate X of the corresponding position using X'=((X+4)>>4)<<4, and the determining the set of motion information predictor candidates comprises selecting, if available, motion information associated with the determined position in the reference layer picture, the determined position indicated by the value X', as the motion information predictor candidate to be included in said set of motion information predictor candidates.

6. A non-transitory computer readable carrier medium comprising processor executable code for performing a method of decoding an image according to a scalable format, said format using a reference layer picture and a resampled picture, an image area of the image being predictively decoded based on motion information, said motion information being itself predictively decoded based on a motion information predictor from a set of motion information predictor candidates, wherein the method comprises, for an image area of a resampled picture:

determining a position in the reference layer picture using a position in the image area of the resampled picture; and determining a set of motion information predictor candidates including a motion information predictor candidate based on motion information associated with an image area belonging to the reference layer picture, wherein the determining the position comprises:

deriving a center position in the image area of the resampled picture;

deriving, in the reference layer picture, a corresponding position of said center position; and deriving a value X' from at least one coordinate X of the corresponding position using X'=((X+4)>>4)<<4, and the determining the set of motion information predictor candidates comprises selecting, if available, motion information associated with the determined position in the reference layer picture, the determined position indicated by the value X', as the motion information predictor candidate to be included in said set of motion information predictor candidates.

\* \* \* \* \*